Patented Aug. 14, 1951

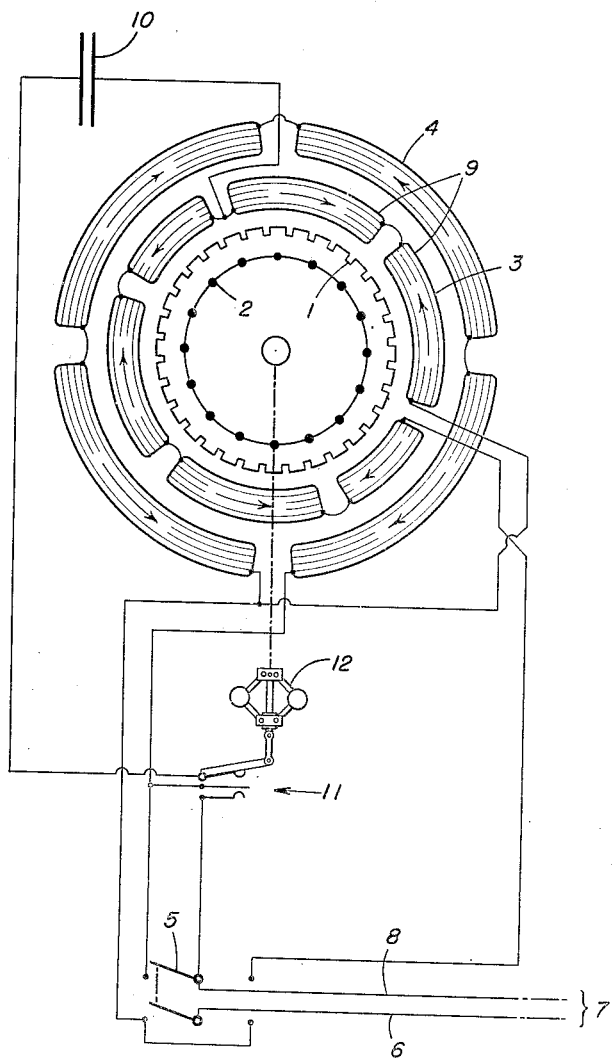

2,564,633

UNITED STATES PATENT OFFICE 2,564,633

MULTISPEED INDUCTION MOTOR

Peter Ziegler, Minot, N. Dak.

Application October 25, 1948, Serial No. 56,319

7 Claims. (Cl. 318—221)

This invention relates to induction motors and more particularly to motors of the multi-speed type.

The primary object of the invention is to provide a multi-speed induction motor requiring no auxiliary starting winding.

Another object of the invention is to provide a multi-speed induction motor having a plurality of primary windings in which the primary windings function as both starting and running windings.

An additional object of the invention is to provide a multi-speed induction motor having a plurality of primary windings in which certain portions of the primary wirings are wired to form a starting winding whereby a uniform starting torque is provided for any speed setting.

A further object of the invention is to provide a multi-speed induction motor which is relatively simple in construction and operation.

Other objects and advantages of the invention will appear hereinafter in the detailed description, be particularly pointed out in the appended claims, and illustrated in the accompanying drawing, in which the figure is a preferred embodiment of the multi-speed motor of the present invention.

Referring now in detail to the drawing in which like reference characters designate like parts, the invention is applicable, in general, to induction motors having a running winding for each speed.

For purposes of illustration, there has been shown an induction motor of two synchronous speeds, having two main windings or sets of windings wound on a multi-slot laminated stator or primary 1 and employing a squirrel cage rotor 2. Of the two main or primary windings or sets of windings, there are a low-speed or inner winding 3 having six poles and a high-speed or outer winding 4, with four poles. These may be obtained in the usual manner by providing six and four windings in the inner and outer sets, respectively, and wiring alternate windings of each set in opposite directions. As shown, the different poles of the six pole winding span those of the four pole winding. Either winding may, of course, be first wound on the stator and the other wound on top of it.

For selective speed control the main windings 3 and 4 may be connected at one end to each other and through a multi-position or throw selector switch 5 to the same side 6 of a power line or current source 7. The other end of each of the main windings is connected to an individual terminal connectable through the switch to the other side 8 of the power line, such that current will flow through one or the other of the windings, depending upon the position of the switch. In the usual induction motor there is also provided an auxiliary winding serving as a starting winding, and connected to the power line on initial closing of the speed control switch. In the motor of the present invention no auxiliary starting winding is necessary, the main windings functioning as both starting and running windings.

To enable the motor to be started without an auxiliary or starting winding there is provided a starting circuit including one of the main windings, in the illustrated case the four-pole winding 4 and a portion of the other main winding 3, obtained by tapping the latter intermediate its ends. As shown, this tapped portion of the winding 3 comprises two of the six poles or windings of the winding, these poles each being numbered 9. In series with the poles 9 is connected a condenser or capacitor 10, the poles being angularly displaced from those of the 4-hole winding, desirably, about 90 electrical degrees. The four-pole winding and the angularly displaced poles of the inner winding are wired in parallel and connectable directly to the other side 8 of the power line 7 through a speed-responsive or centrifugal starting switch 11. While shown in open position, this switch is normally closed and is made speed-responsive through a governor or the like 12 connected to the rotor 2, the switch thus being opened when the motor has started and reached a predetermined speed.

Using the above windings and wirings, initial closing of the selector switch 5 in either position will shunt the line current via the then closed speed-responsive switch 11, through the starting circuit comprised of the four-pole winding 4 and the tapped two poles 9 of the six-pole winding, which, by reason of the angular displacement of the two poles of the latter winding, imparts the necessary starting torque to the rotor 2. Once the rotor has gained speed, the governor 12 opens the speed-responsive switch 11, breaking the starting circuit, and switches or shifts the current to the main winding for which the selector switch has been set. Thereafter, the motor continues to run at the speed determined by the connected main winding. While running, the motor may be changed, if desired, from one to the other of its two speeds by throwing of the selector switch in the opposite direction without involving the starting circuit, so long as the speed of the rotor does not drop below that for which the governor 12 has been set, during the changeover. Since the same starting circuit is employed for either speed of the motor, the starting torque will be uniform and not subject, as with many auxiliary starting windings, to variations depending on the selected ultimate speed. It will be perceived that when the motor of the illustrated embodiment is set for low-speed operation, not only the poles 9 but the remaining four poles of the six-pole winding, as well, will initially be connected with the condenser 10, the four poles in parallel. However, by utilizing a condenser of the proper characteristics, the amount of current flowing through these four poles is readily held to a minimum such that its effect upon the starting torque is negligible. Separate main windings being required in multi-speed motors of the type here under discussion and the usual motor also employing a speed-responsive cut-out to disconnect the separate starting winding once the motor is running, the motor of the present invention, requiring no starting winding, retains the desirable characteristics of motors heretofore employed, but through a much simpler construction.

From the above detailed description it will be apparent that there has been provided a multi-speed induction motor wherein the main or running speed windings are caused to function as the starting windings as well, thus eliminating the necessity for providing auxiliary windings and providing constant starting torque, regardless of the speed for which the motor has been set. It should be understood that the described and disclosed embodiment is merely exemplary of the invention, and that all modifications are intended to be included which do not depart either from the spirit of the invention or the scope of the appended claims.

Having described my invention, I claim:

1. A multi-speed induction motor comprising a plurality of sets of main windings, certain of the windings of one of said sets having poles displaced relative to poles of windings of a second of said sets, said certain windings being wired in series with a capacitor and in parallel with said second set to provide a starting circuit, a multi-position switch adapted to connect any of said sets to a source of current, and speed-responsive means shunting the current through said starting circuit on initial closing of said switch and adapted at a predetermined speed to shift said current to the main set of windings for which said switch is positioned.

2. A multi-speed induction motor comprising a plurality of sets of main windings, certain of the windings of one of said sets having poles displaced from poles of windings of a second set and being wired in parallel therewith to form a starting circuit, a multi-position switch for connecting any of said sets to a current source, and speed-responsive means shunting current through said starting circuit on initial closing of said switch and shifting said current to the set for which said switch is positioned after the motor is started.

3. A two-speed induction motor comprising two primary windings, a portion of one of said windings having poles angularly displaced from said other winding and being wired in parallel therewith to form a starting circuit, a two-position switch connecting either of said windings to a current source, and speed-responsive means operative on initial closing of said switch to shunt the current through said starting circuit and after said motor has started to shift said current to the primary winding for which said switch is positioned.

4. A two-speed induction motor comprising two primary windings, a portion of one of said windings having poles angularly displaced relative to poles of said other winding, said portion of said one winding being wired in series with a condenser and in parallel with said other winding to form a starting circuit, a two-position switch connecting either of said windings to a current source, and speed-responsive means operative on initial closing of said switch to shunt the current through said starting circuit and after said motor has started to shift said current to the primary winding for which said switch is positioned.

5. A two-speed induction motor comprising two primary windings having different numbers of poles, certain of the poles of one of said windings being angularly displaced from poles of said other winding, said windings of said certain poles being wired in series with a condenser and in parallel with said other winding to form a starting circuit, a two-position switch connecting either of said windings to a current source, and speed-responsive means operative on initial closing of said switch to shunt the current through said starting circuit and after said motor has started to shift said current to the primary winding for which said switch is positioned.

6. A multi-speed induction motor comprising a plurality of sets of main windings, certain of the windings of one of said sets having poles displaced from poles of windings of a second set and being wired in parallel therewith to form a starting circuit, a multi-position switch for connecting any of said sets to a current source, and means shunting current through said starting circuit on initial closing of said switch and shifting said current to the set for which said switch is positioned after the motor is started.

7. A multi-speed induction motor comprising a plurality of sets of main windings having different numbers of poles, certain of the windings of one of said sets having poles displaced from poles of windings of a second set and being wired in parallel therewith to form a starting circuit, a multi-position switch for connecting any of said sets to a current source, and speed-responsive means shunting current through said starting circuit on initial closing of said switch and shifting said current to the set for which said switch is positioned after the motor is started.

PETER ZIEGLER.

REFERENCES CITED

The following references are of record in the file of this patent:

UNITED STATES PATENTS

| Number | Name | Date |
| --- | --- | --- |
| 2,454,136 | Carville | Nov. 16, 1948 |